May 8, 1962     A. J. BENKOCZY ET AL     3,034,020
STATIC DISCHARGER
Filed June 27, 1960
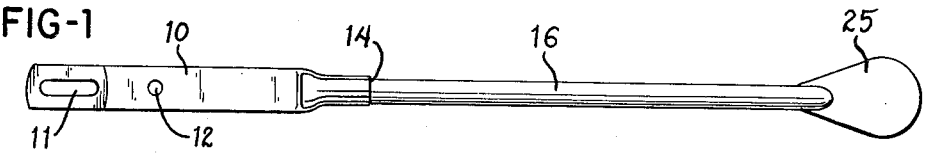
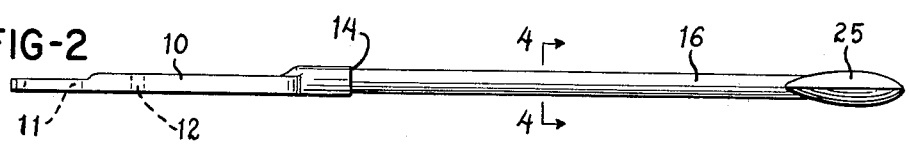
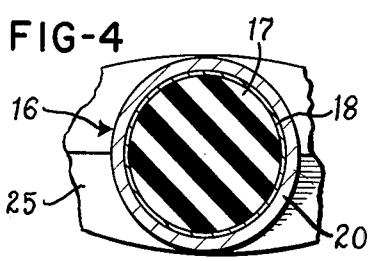
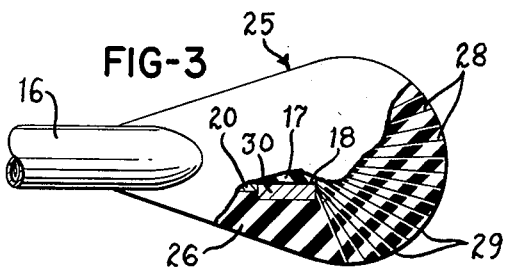
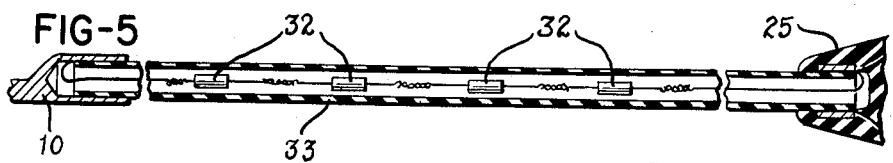
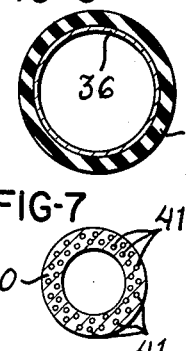
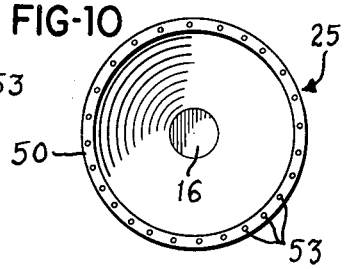
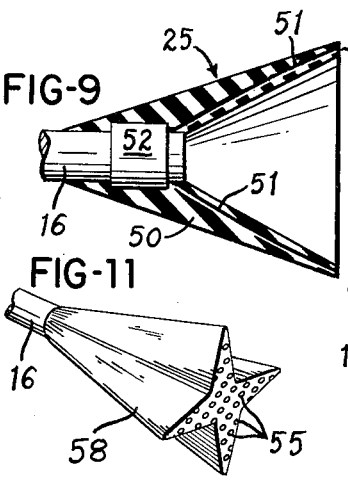
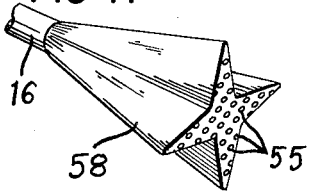
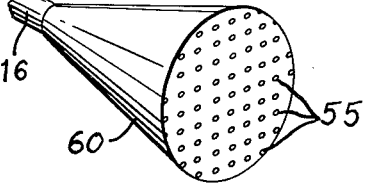
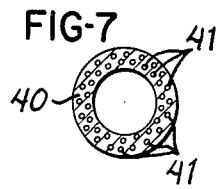
*INVENTORS*
ANDREW J. BENKOCZY &
DON S. GRANT
BY
*Mauchal, Biebel, French & Bugg*
ATTORNEYS United States Patent Office 3,034,020
Patented May 8, 1962

3,034,020
STATIC DISCHARGER
Andrew J. Benkoczy, Miami, and Don S. Grant, Fort Lauderdale, Fla., assignors to Dayton Aircraft Products, Inc., Fort Lauderdale, Fla., a corporation of Ohio
Filed June 27, 1960, Ser. No. 39,050
7 Claims. (Cl. 317—2)

This invention relates to high tension static charge conducting devices and more particularly to static dischargers for dissipating static electric charges from surfaces of high performance aircraft and similar vehicles.

It is known that aircraft and similar vehicles may become highly charged with static electricity in flight. This charge may be formed as a result of one, or a combination of, static inducing phenomena. For instance, static charges may be induced on the structure or the skin of an air vehicle due to the impinging of ice, dust, or other particles upon the surface. This phenomenon is called triboelectricity or frictional charge.

Another cause of static electricity is that induced as a result of thunderstorm activity in the vicinity of the aircraft or structure in flight. This may be either the result of the vehicle flying in close proximity to a cloud mass of single polarity, or the result of a vehicle forming a part of a conductive path between two cloud masses of opposite polarity.

A still further cause of static electrical charge has been traced to that of the operation of the jet engine. It is theorized that the positive and negative charges in the ionized jet flame are separated due to the very great difference in mass between the negative electrons and the positively ionized gas particles, thus inducing a static charge on the airframe.

Such static electrical charges produced by any one or more of the above causes or by any other cause, result in radio noise interference, often known as precipitation static. It has been found that such static charges can be dissipated or eliminated by means of wick dischargers, now in common use, strategically located along trailing edges of the airframe or vehicle, to discharge into the surrounding air or slipstream during flight. However, wick dischargers lose their effectiveness after exposure to the elements due to a gradual washing out of the conductive material. Also, the fabric fibers fray and break away due to the exposure to high aerodynamic loading, thereby requiring maintenance and replacement. Further, such wick dischargers do not withstand high wind stream loads such as encountered on high performance vehicles.

This invention overcomes these disadvantages and others by providing a mechanically firm discharger which is arranged to withstand extremely high aerodynamic loads. The discharge device of this invention consists of a rod within or onto which is formed or carried a conductive path of predetermined resistance gradient. One end of the rod is arranged for connection to the skin of such a vehicle for the conduction of electrical charges therefrom. A discharge radiator is carried at the extended end of the rod and is preferably of preformed or of predetermined fixed shape and includes conductors for the dissipation of the charge. The static discharger of this invention lends itself to aerodynamic design for minimum parasitic resistance.

It has been found that the static dischargers of this invention operate as efficient lightning diverters for air vehicles, located as they are adjacent the wing tips and outer empennage surfaces which are usually the points of maximum D.C. potential gradient in thunderstorm activity. The diverter extends in trailing relation to such surfaces and therefore has been found to operate both as a dissipator for draining off a charge and a diverter providing a preferred conducting path for a direct stroke so that the charge may be carried directly to primary air frame structure and thus diverted from the skin components to be protected. The discharger thereby provides lightning diverter protection for aircraft without the necessity of installing separate lightning diverters. The discharger has the further characteristic of being destroyed, or at least visibly damaged, by a direct stroke while diverting such charge, and is thus readily noticeable as requiring replacement without the danger of continuing to operate with an apparently sound, but electrically changed, discharger or diverter after having been hit.

A principal object of this invention is to provide a static discharger as outlined above characterized by a long service life, having elements not subject to wash-out or deterioration and resistant to abrasion. An advantage of this discharger resides in its uniformity and consistency in use.

A further object of this invention is to provide a static discharger as outlined above characterized by a high and predictable and consistent efficiency, with a low noise to current ratio.

A still further object of this invention is to provide a static discharger as outlined above which is particularly adapted to variation of its physical characteristics, to provide control over its aerodynamic characteristics, as desired. This results in a discharger having optimum physical characteristics for minimum parasitic resistance.

Another object of this invention is to provide a static discharger as outlined above having a mechanically rigid conductive rod for supporting a corona radiator of a fixed configuration.

Yet another object of this invention is to provide a static discharger as outlined above having a rigid radiator with a plurality of conductors imbedded therein, the spacing of exposed ends of such conductors being fixed, one to the other, in such a manner as to provide for maximum radiation efficiency.

A further object of this invention is to provide a static discharger characterized by the above features which is also an effective lightning diverter.

Other objects and advantages of the invention will be apparent from the following description, the accompanying drawings and the appended claims.

In the drawings:

FIG. 1 is a plan view of a static discharger made in accordance with the teachings of the present invention;

FIG. 2 is a side view of the discharger of FIG. 1;

FIG. 3 is an enlarged and partially broken away view of the static radiator end;

FIG. 4 is an enlarged section through the rod portion of the discharger taken generally along line 4—4 of FIG. 2;

FIG. 5 is a fragmentary enlarged section longitudinally through the rod showing a modified form of the discharger;

FIGS. 6–8 are cross sectional views through additional embodiments of rod portions of the discharger;

FIG. 9 is a sectional view through a modified form of a radiator;

FIG. 10 is an end view of the radiator of FIG. 9; and

FIGS. 11 and 12 are further modifications of the discharge radiator.

Referring to the drawings, which illustrate preferred embodiments of this invention, the static discharger illustrated in FIG. 1 is shown as including a conductive mechanical fitting 10 having an attachment slot 11 and a hole 12 by means of which the discharger may be attached to the skin of an aircraft, missile, or other vehicle on which a static charge is known to collect. Usually, the fitting 10 is attached adjacent the trailing edges of a wing, horizontal or vertical stabilizer, or tail cone of such vehicle and preferably at a structural component of the airframe.

The fitting 10 provides mechanical and electrical connection to the skin of such vehicle and includes an open end 14 within which a resistance rod 16 is mechanically supported in extending relation therefrom and having an electrical connection to the fitting 10 so that the static charge is conveyed directly from the surface of the vehicle to the rod 16.

The body 17 of the rod 16 is preferably formed of essentially non-conducting material, such as resin-fiberglass reinforced polyester, nylon, or other suitable material characterized by mechanical strength, toughness, and rigidity. Means forming a conductive path in the rod 16 of a predetermined resistance gradient may include a suitable film coating, or dispersion, rendering the entire length of the rod conductive, as shown in FIGS. 4, 6, 7 and 8, or the rod may form an insulating supporting structure for electrically interconnected resistor elements, as shown in FIG. 5. In FIG. 4, the rod 16 is shown as being coated with a film of resistance material 18 having specific high voltage characteristics and low noise.

It is important that the resistance of the conductive path formed by the rod 16 be predetermined within a given range and gradient, and it is also important that such resistance be maintained in use notwithstanding the severe conditions to which the discharger is subjected as it travels through the atmosphere at high speed. Therefore, the material 18 is semi-conductive and particularly distributed to provide a total resistance gradient in the order of about 20 megohms.

The material 18 may be made up of a thermosetting resin in which is dispersed fine particles of carbon, metal, and/or graphite. A further example of one composition of a material 18 suitable for coating on the rod 16 is described in the patent to Sullivan et al. 2,631,189 of March 10, 1953 and assigned to the same assignee as this application. The particle sizes and density of the conducting material are adjusted to provide the required electrical resistance when applied to the rod within predetermined thickness limits. A further method of forming a suitable semi-conductive coating material 18 may be that of vacuum-depositing carbon film or metal film directly to the body 17 of the rod 16. Where a resin material is used, the rod assembly is baked after coating so as to cure the resin.

A protective coating 20, such as abrasion-resistant enamel, is applied to the rod 16 subsequent to the application of the material 18, except at the extreme ends of the rod where electrical contact is made, to provide weather and mechanical abrasion protection for the material 18. The rod 16 is therefore essentially rigid or firm and makes electrical contact with the fitting 10 at the material 18, and extends in fixed relation from the fitting 10 and from the surface of an aircraft to which the fitting 10 may be attached for the conduction and dissipation of static electrical charges.

Means for dissipating the static charge conducted by the rod 16 includes a corona discharging element or radiator 25 mechanically supported at the extended end of the rod. The radiator 25 includes a body 26 which is preformed into a predetermined and essentially fixed aerodynamic shape, such as the fan-shaped body 26 of FIG. 3, and is preferably formed of suitable insulating material, such as plastic or resin. The radiator 25 includes conductor means electrically connected to the material 18 of the rod 16 for the conduction and the dissipation of the electrical charge therefrom to static discharge points in the form of a plurality of fine wires 28 imbedded within the body 26. The wires 28 are therefore held in a predetermined fixed geometric relation one to the other with inner portions connected to receive static charges from the rod 16 for conduction to exposed corona discharging points or ends 29 from which the static charge is dissipated.

It is understood that the particular spacing of the individual wires 28, and the predetermined spaced relation of the exposed ends 29, may be varied or controlled to provide the desired static charge dissipation. As an example, but in no way intended as a limitation, the wires may be formed of chromium nickel or stainless steel of 0.001 inch or less in diameter, and a particularly efficient transverse spacing of the wires has been found where such space between the exposed ends 29 is equal to 20 diameters of the wire.

Any suitable arrangement may be employed by means of which the radiator 25 is connected to the rod 16, and one such arrangement includes a metallic sleeve 30 making electrical connection to the conductive material 18 of the rod 16 on the one hand, and electrical connection to the wires 28 of the radiator 25 on the other hand. The sleeve 30 may also, but not necessarily, mechanically support the body 26 of the radiator 25, and means may be provided to permit separate replacement of the radiator 25 such as a threaded connection.

The semi-conductive material or coating may be incorporated in or on one or more suitable mechanical elements included within a supporting structure. Such is shown in FIG. 5 wherein suitable low-noise carbon resistors 32 are connected in series and are incorporated within a resistance rod 16 having a hollow insulating body 33. The resistors are electrically conected to receive static charges from the holder at one end and transmit such charges to the conductors in the radiator 25 at the other end.

As an example of the form which such fixed resistors may be used in this invention, a resistance of 5 megohms each for an illustrative total of 20 megohms has been found satisfactory. It is also within the scope of this invention to "grade" the resistors 32, such as by using higher value resistances adjacent the radiator 25 and progressively decreasing the resistance with decreasing distance to the air frame, as the use of such graded resistance steps has been found to be of value in lightning diverter applications.

The rod 16 may conveniently assume additional mechanical and electrical forms, as shown by the embodiments of FIGS. 5–7. In FIG. 6, the rod 16 is shown as including a hollow insulating body 35, which may consist of the materials of the body 17 of FIG. 4. A semi-conductive coating material 36, similar to the material 18, is suitably bonded to the inside surface of the body 35. It can be seen that this embodiment of the rod 16 provides suitable weather and mechanical abrasion protection to the resistance material 36 by reason of the hollow outer body 35, while maintaining mechanical strength. Suitable electrical and mechanical connection may be readily made to the rod 16 at the fitting 10 and at the radiator 25.

FIGS. 7 and 8 illustrate further embodiments of the rod 16 as consisting of an essentially rigid insulating body 40 which may be formed of material as described in connection with the body 17. Uniformly dispersed throughout the body 40 are finely divided particles of conductive material 41 such as graphite, metal, or carbon, thereby making the rod itself semi-conductive. The body 40 may be hollow as shown in FIG. 7, solid as shown in FIG. 8, or any other configuration, such as a non-circular cross section, as determined by the mechanical or aerodynamic requirements of the application or installation.

FIGS. 9 and 10 illustrate a modified form of the radiator 25 as including a generally cone-shaped body 50 suitably bonded or otherwise mechanically fixed to the rod 16. The body 50 includes a plurality of wires 51 imbedded therein with inner ends electrically connected to a sleeve 52 and exposed outer ends 53. The sleeve 52 is, in turn, electrically connected to the rod 16 or to the conductive path formed by or carried in the rod. The outer ends 53 of the wires 51 are spaced in fixed relation, as shown in FIG. 10, for the most efficient dissipation of the static charge. The arrangement of the conductors or wires within the radiator need not be in a single line or row, as shown in the preceding embodiments, but such may be arranged both longitudinally and vertically, as shown by the wires 55 in the star-shaped radiator 58 of FIG. 11 and the cone-shaped radiator 60 of FIG. 12. The overall configuration of the radiator, and the spacing of the wires and their exposed corona discharging points one from the other may be varied to suit the requirements of a given installation, having in mind the aerodynamic characteristics and the desired efficiency of the discharger.

It is therefore seen that this invention provides a static discharger of uniform and predetermined characteristics which is substantially impervious to the effects of weathering and which is suitable for use on very high speed vehicles. The device further provides the characteristics of an effective lightning diverter, thus providing protection as well as elimination of precipitation static.

The term "resistance rod" as used in the appended claims refers to a rod arrangement, including any one of the several described herein, wherein a resistance is established by a continuous or discontinuous coating, dispersion, or one or more resistor elements associated with the rod.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. A high tension static charge conducting device of the class described for attachment to an aircraft, comprising an essentially rigid rod having one end arranged for fixture to the surface of such aircraft with another end extending in fixed relation therefrom, means in said rod forming a fixed resistance path for the conduction of static electric charges from said aircraft surface, and a discharge radiator having a non-conductive body of predetermined aerodynamic shape formed on said extended end of said rod and including a plurality of conductors therein arranged in a predetermined pattern with inner ends electrically connected to receive said static electric charges from said path and having exposed outer ends spaced at fixed predetermined intervals from each other for the dissipation of said charges.

2. A high tension static charge conducting device of the class described for attachment to the surface of an aircraft, comprising a resistance rod of predetermined electrical resistance having one end arranged for the conduction of static electricity from the surface of such aircraft with another end extending therefrom, and a radiator of preformed rigid aerodynamic shape connected at said extended end having a dielectric body and a plurality of conductors in fixedly spaced relation embedded therein, said conductors having inner portions electrically connected to receive said charges from said rod and exposed outer portions spaced at fixed predetermined intervals from each other for the dissipation of said charges.

3. A high tension static charge conducting device of the class described, comprising a holder arranged for connection to the surface of an air vehicle, a resistance rod connected to said holder and arranged to extend from said vehicle for the transmission of static charges from said surface, and a discharge radiator of predetermined fixed shape connected to the extended end of said rod and including a plurality of fine wires embedded therein terminating at a surface of said radiator in exposed fixedly spaced corona discharging points electrically connected to said rod for the dissipation of said charges therefrom.

4. A high tension static charge conducting device of the class described, comprising a holder arranged for mechanical fixture and electrical connection to the skin of an aircraft, an essentially rigid non-conductive rod mechanically connected to said holder and extending therefrom, said rod containing a plurality of fixed low noise resistors electrically connected to said holder for the transmission of static charges from said aircraft skin, and an aerodynamically shaped discharge radiator mechanically supported at the extended end of said rod and including a plurality of conductors embedded therein electrically connected to said resistors terminating at a surface of said radiator in fixed exposed ends for the dissipation of said charges.

5. A high tension static charge conducting device of the class described, comprising a holder arranged for mechanical and electrical connection to the skin of an aircraft, an essentially rigid resistance rod electrically and mechanically connected to said holder and extending therefrom in the slipstream of said aircraft for the transmission of static electric charges from said aircraft skin, and a discharge radiator connected at the extended end of said rod, said radiator having an aerodynamically shaped body of preformed insulating material with a plurality of conducting wires having a diameter not greater than .001 inch imbedded therein electrically connected to said rod and having exposed outer ends fixedly spaced at predetermined intervals from each other in the order of twenty times the said wire diameter for the dissipation of said charges into said slipstream.

6. A high tension static electric charge conducting device of the class described, comprising a holder arranged for mechanical fixture and electrical connection to a conducting surface of an aircraft, an essentially rigid tubular non-conductive rod mechanically connected to said holder and extending therefrom, said rod containing therein in axially spaced apart relation a plurality of series-connected fixed low noise resistors electrically connecting at one end to said holder for the transmission of static charges from said aircraft surface, a fan-shaped non-conductive rigid discharge radiator formed on the extended end of said rod, said radiator having a plurality of fine wires embedded therein in fixedly spaced relation to each other, said wires converging at their inner ends and electrically connected to receive static discharges through said resistors and terminating at fixedly spaced corona discharging points at the trailing edge surface of said radiator.

7. The device of claim 6 wherein said resistors are graded in ohmic value with the resistor of lowest resistance positioned in said rod nearest said holder and the resistor of highest resistance positioned nearest said radiator.

References Cited in the file of this patent

UNITED STATES PATENTS

| | | |
|---|---|---|
| 2,084,523 | Crawford | June 22, 1937 |
| 2,243,618 | Brown | May 27, 1941 |
| 2,536,818 | Lawton | Jan. 2, 1951 |
| 2,732,517 | Alabaster | Jan. 24, 1956 |